(12) United States Patent
Chou

(10) Patent No.: US 7,872,387 B2
(45) Date of Patent: Jan. 18, 2011

(54) MOTOR WITH SINGLE BEARING

(75) Inventor: Chu-Hsien Chou, Taipei (TW)

(73) Assignee: Asia Vital Components Co., Ltd., Kaohsiung (TW)

( * ) Notice: Subject to any disclaimer, the term of this patent is extended or adjusted under 35 U.S.C. 154(b) by 1841 days.

(21) Appl. No.: 10/979,204

(22) Filed: Nov. 3, 2004

(65) Prior Publication Data
US 2006/0091749 A1     May 4, 2006

(51) Int. Cl.
*H02K 5/16* (2006.01)
(52) U.S. Cl. ...................... 310/90; 310/67 R
(58) Field of Classification Search ............... 310/67 R, 310/89–90, 63
See application file for complete search history.

(56) References Cited

U.S. PATENT DOCUMENTS

| | | | | |
|---|---|---|---|---|
| 4,783,608 A * | 11/1988 | Gruber et al. | .................. | 310/90 |
| 4,955,791 A * | 9/1990 | Wrobel | ........................ | 417/354 |
| 5,982,064 A * | 11/1999 | Umeda et al. | .................. | 310/90 |
| 6,107,717 A * | 8/2000 | Lin et al. | ....................... | 310/90 |
| 6,265,798 B1 * | 7/2001 | Huang et al. | ............... | 310/90.5 |
| 2003/0006659 A1 * | 1/2003 | Yeh | .............................. | 310/90 |

* cited by examiner

*Primary Examiner*—Thanh Lam

(57) ABSTRACT

A motor with single bearing comprises a fan blade set, a motor set and a fan blade base. The fan blade set has a fan blade hub to join with a spindle fitting with a bearing. The motor set is attached to the fan blade base and a hollow axial seat is provided in the fan blade base to receive the bearing. Further, an elastic element or magnetic element is disposed at the axial seat to avoid internal clearance being created by lacking preset pressure acing to the bearing casing and balls therein. The balls and the bearing itself can run successfully to enhance operation of the motor effectively.

14 Claims, 10 Drawing Sheets

MOTOR WITH SINGLE BEARING

BACKGROUND OF THE INVENTION

1. Field of the Invention

The present invention is related to a motor with single bearing and particularly to an elastic element or magnetic element provided in the axial seat of a motor and the elastic element or the magnetic element to offer preset pressure to the bearing casing and the balls therein such that it prevents from producing internal clearance and allows the balls and the bearing run successfully.

2. Brief Description of the Related Art

Due to rapid progress of computer information industry, the central processing unit in the information product provides much faster operation speed and heat generation becomes much more increased. Cooling device is utilized as a basic arrangement in the information product to dissipate heat. Currently, the most popular cooling device is cooling fan because of being convenient in use and cheap in cost. Quality of a cooling fan completely depends on the operational state being good or bad. Unsteady motor significantly influences normal operation of entire system or device. More specifically, the bearing in the motor is key factor influencing quality and steadiness of the motor.

Generally, ball bearings in the motor provide a plurality of balls turning in the bearing casing while the bearing runs. It is very easy for the bearings to create internal clearances and these internal clearances affect operation and effect of the motor to result in deficiencies such as vibration, noise, heat generation and power abnormal consumption.

In addition, balls vibrate in the bearing can cause the rolling channel minor vibrating wear. Thus, it is required to exert an appropriate preset pressure to solve the problem resulting from internal clearances.

SUMMARY OF THE INVENTION

An object of the present invention is to provide a motor with single bearing with which an elastic element or magnetic element is disposed at the axial seat to create a preset pressure against the bearing casing and balls therein to avoid internal clearance being created so that balls and the bearing itself can run successfully to enhance operation of the motor effectively.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTION

Figure 1:
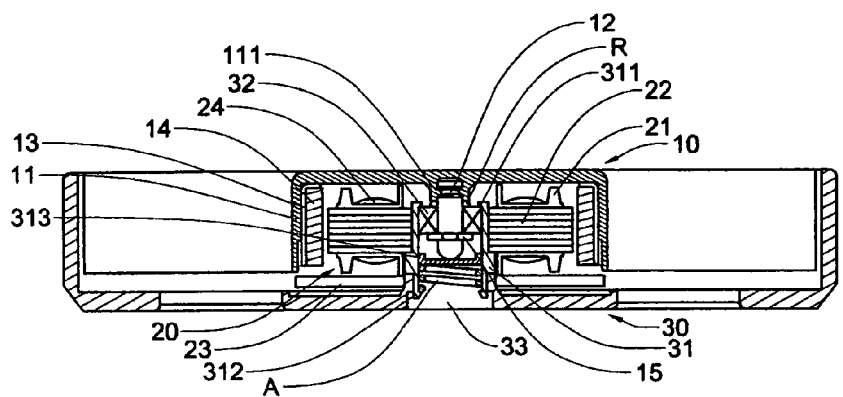
FIG. 1 is a sectional view of the first embodiment of single bearing of a motor according to the present invention.

Referring to FIG. 1, the first embodiment of a motor with single bearing according to the present invention comprises a fan blade set 10, a motor set 20 and a fan base 30. The fan blade set 10 is composed of a fan blade hub 11, a spindle 12, a motor casing 13 and a magnetic strip 14. The spindle 12 is attached to a spindle seat 111 at the central bottom of the fan blade hub 11. The motor casing 13 is provided at the inner side of the fan blade hub 11 and the magnetic stripe 14 is disposed at the inner side of the motor casing 13.

The motor set 20 is attached to the fan base 30 and is composed of an insulation frame 21, silicon-steel sheet 22, a circuit board 23 and a coil 24. The silicon-steel stripe 22 is disposed outside the insulation frame 21 and surrounds the insulation frame 21 with the coil 24. The fan base 30 has a hollow axial seat 31 at the center thereof and the circuit board 23 is disposed between the axial seat 31 and the bottom of the insulation frame 21. The spindle 12 is mounted in a receiving space of the axial seat 31. A bearing 32 is fitted between the spindle 12 and the axial seat 31 with a plurality of balls in the bearing 32 (not shown) to allow the spindle 12 rotating under being loaded with the bearing 32. Further, a oil ring R is provided between the bearing 32 and the fan blade hub 11.

The axial seat 31 has a jut part 311 and an engaging piece 312 at the inner side thereof and the spindle 12 has a circular shape with a retaining ring 15 at an end thereof without connecting with the fan blade hub 11. The bearing 32 can be located by way of the jut part 311 limiting the bearing 32 and the bearing 32 interferes with the retaining ring 15 to prevent the spindle 12 from escaping from the axial seat 31. The axial seat 31 has a bottom 313 to limit the end of the spindle 12 not connecting with the fan lade hub 11. An elastic element A is provided between the engaging piece 312 and the bottom 313 of the axial seat 31 to produce an elastic force against the bearing including the bearing casing and the internal balls as a preset pressure so as to avoid internal clearance caused by lacking the preset pressure and to facilitate successful running of the balls and the bearing 32 for enhancing the operational effect of the motor and such as reducing vibration, noise, heat generation and power consumption and prolonging the life span. In practice, the elastic element A can be a spring, an elastic sheet, an elastic washer or a magnetic component. The elastic element A shown in the figure is a spring. Besides, the bottom 313 of the axial seat 31 can be an independent part of the axial seat 31.

Figure 2:
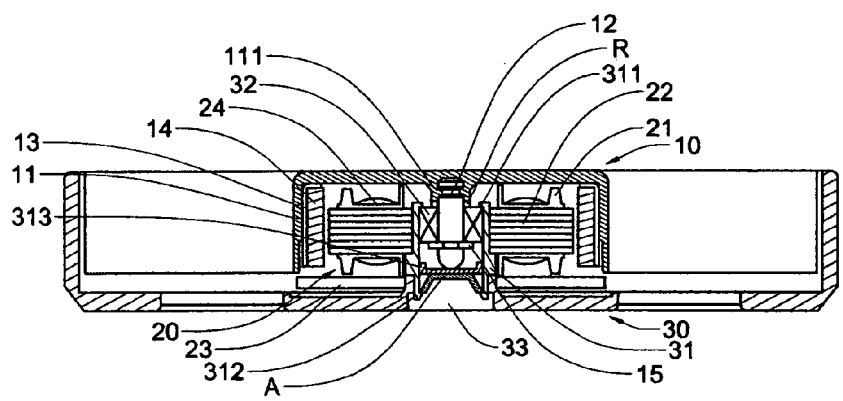
FIG. 2 is a sectional view of the second embodiment of single bearing of a motor according to the present invention.

Referring to FIG. 2, the second embodiment of a motor with single bearing according to the present invention is illustrated. The structure of the second embodiment is almost the same as the first embodiment and the difference of the second embodiment from the first embodiment is in that the elastic element A is an elastic stripe.

Figure 3:
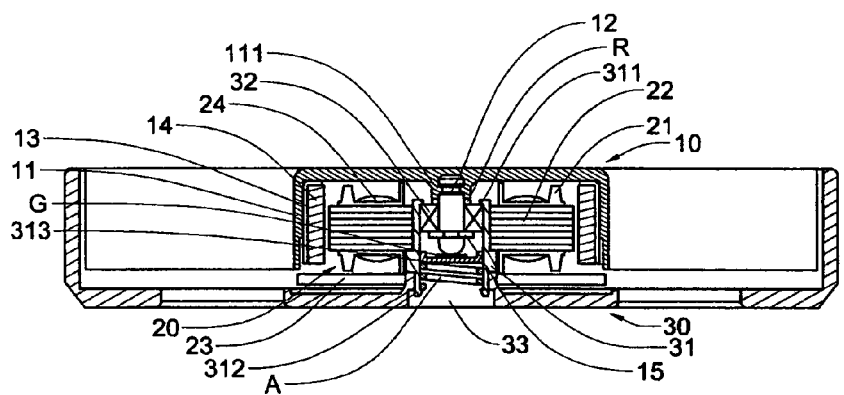
FIG. 3 is a sectional view of the third embodiment of single bearing of a motor according to the present invention.

Referring to FIG. 3, the third embodiment of a motor with single bearing according to the present invention is illustrated. The structure of the third embodiment is almost the same as the first embodiment and the difference of the third embodiment from the first embodiment is in that a wear elastic stripe G can be added between the bottom 313 and the end without connecting with the fan blade hub 11 on the spindle 12, i.e., the wear elastic sheet G can be attached to a lateral side of the bottom 313 of the axial seat 31 so that that the spindle 12 or the axial seat 31 becomes less wear and life span thereof can be extended.

Figure 4:
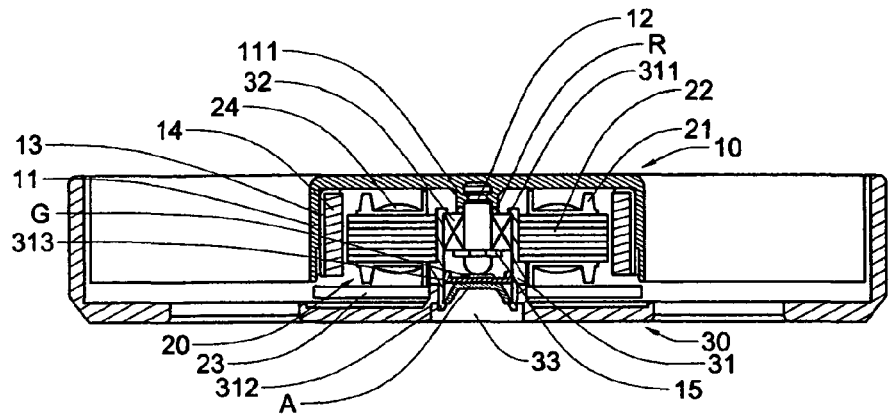
FIG. 4 is a sectional view of the fourth embodiment of single bearing of a motor according to the present invention.

Referring to FIG. 4, the fourth embodiment of a motor with single bearing according to the present invention is illustrated. The structure of the fourth embodiment is almost the same as the second embodiment and the difference of the fourth embodiment from the second embodiment is in that a wear elastic stripe G can be added between the bottom 313 and the end without connecting with the fan blade hub 11 on the spindle 12, i.e., the wear elastic sheet G can be attached to a lateral side of the bottom 313 of the axial seat 31 such that the spindle 12 can be free from contacting with bottom 313 of the axial seat 31 to provide a function of the third embodiment.

Figure 5:
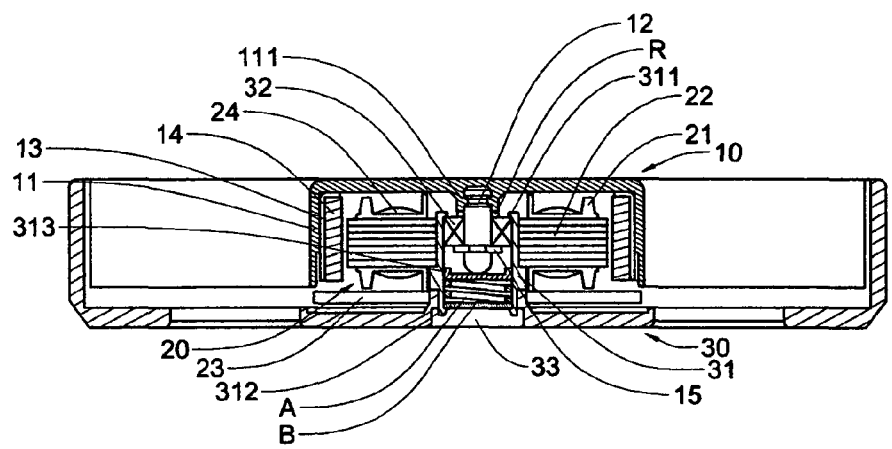
FIG. 5 is a sectional view of the fifth embodiment of single bearing of a motor according to the present invention.

Referring to FIG. 5, the fifth embodiment of a motor with single bearing according to the present invention is illustrated. The structure of the fifth embodiment is almost the same as the first embodiment and the difference of the fifth embodiment from the first embodiment is in that the center of the fan base 3 has a central hole 33 and a baffle piece B can be inserted between the elastic element A and the engaging piece 312 to hide the central hole 33 for keeping the entire fan base 3 being pleased to the eye.

Figure 6:
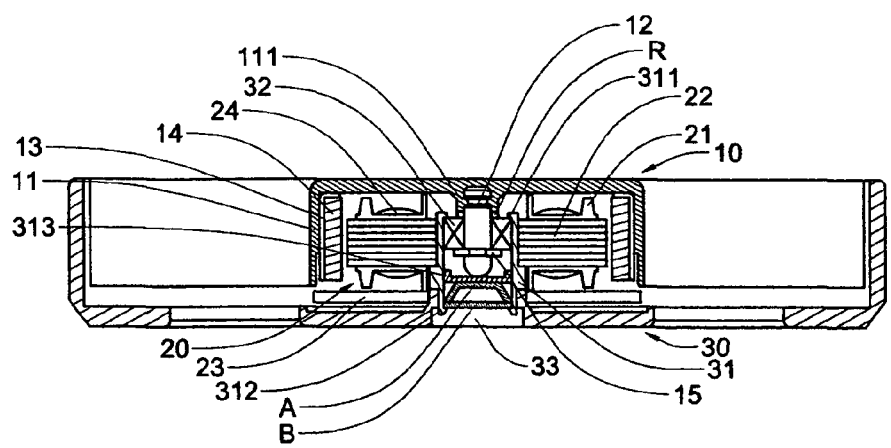
FIG. 6 is a sectional view of the sixth embodiment of single bearing of a motor according to the present invention.

Referring to FIG. 6, the sixth embodiment of a motor with single bearing according to the present invention is illustrated. The structure of the sixth embodiment is almost the same as the second embodiment and the difference of the sixth embodiment from the second embodiment is in that the center of the fan base 3 has a central hole 33 and a baffle piece B can be inserted between the elastic element A and the engaging piece 312 to hide the central hole 33. It provides the same function as the fifth embodiment.

Figure 7:
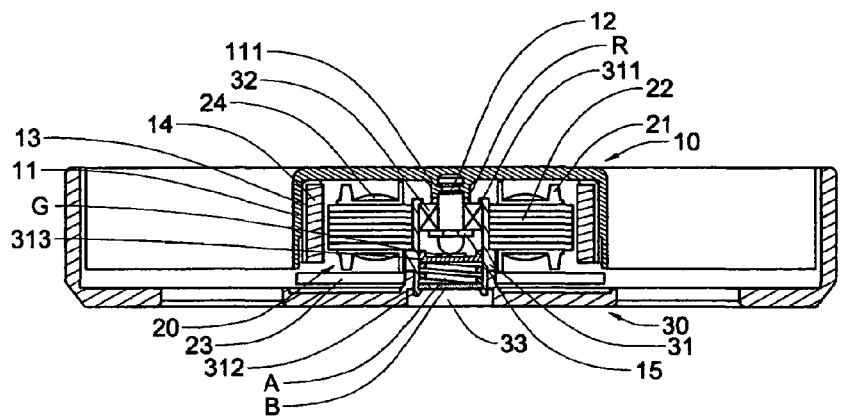
FIG. 7 is a sectional view of the seventh embodiment of single bearing of a motor according to the present invention.

Referring to FIG. 7, the seventh embodiment of a motor with single bearing according to the present invention is illustrated. The structure of the seventh embodiment is almost the same as the third embodiment and the difference of the seventh embodiment from the third embodiment is in that the center of the fan base 3 has a central hole 33 and a baffle piece B can be inserted between the elastic element A and the engaging piece 312 to hide the central hole 33. It provides the same function as the fifth embodiment.

Figure 8:
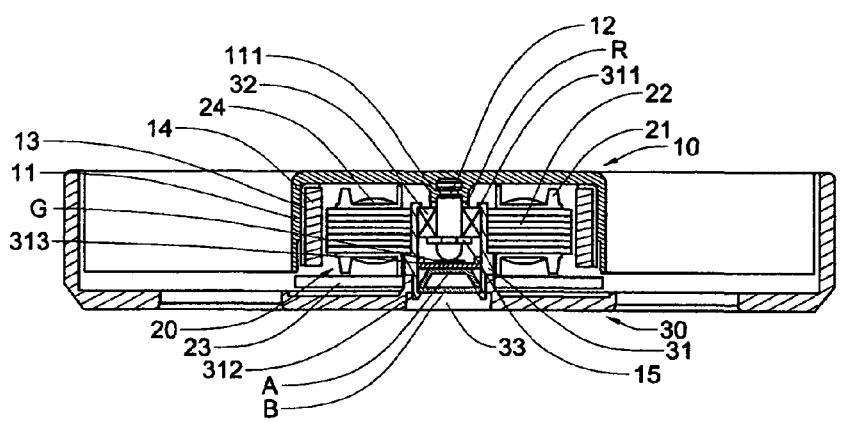
FIG. 8 is a sectional view of the eighth embodiment of single bearing of a motor according to the present invention.

Referring to FIG. 8, the eighth embodiment of a motor with single bearing according to the present invention is illustrated. The structure of the seventh embodiment is almost the same as the fourth embodiment and the difference of the seventh embodiment from the fourth embodiment is in that the center of the fan base 3 has a central hole 33 and a baffle piece B can be inserted between the elastic element A and the engaging piece 312 to hide the central hole 33. It provides the same function as the fifth embodiment.

Figure 9:
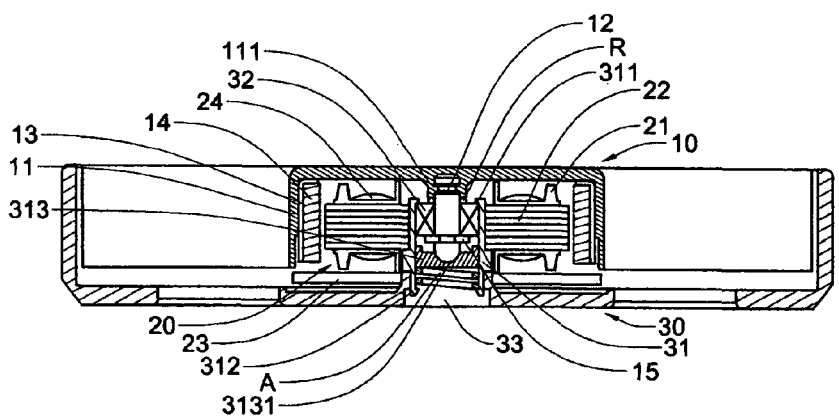
FIG. 9 is a sectional view of the ninth embodiment of single bearing of a motor according to the present invention.

Referring to FIG. 9, the ninth embodiment of a motor with single bearing according to the present invention is illustrated. The structure of the ninth embodiment is almost the same as the first embodiment and the difference of the seventh embodiment from the fourth embodiment is in that the spindle 12 has a circular end without connecting with the preceding fan blade hub 11 and the bottom 313 has a circular groove 3131 corresponding to the circular end of the spindle 12 so as to connect with the spindle 12. Thus, the spindle 12 can rotate in accordance with the circular groove 3131 and the spindle 12 can a function of locating to constitute a steady state of rotation by way of support of the bottom 313 of the axial seat 31 and the bearing 32.

Figure 10:
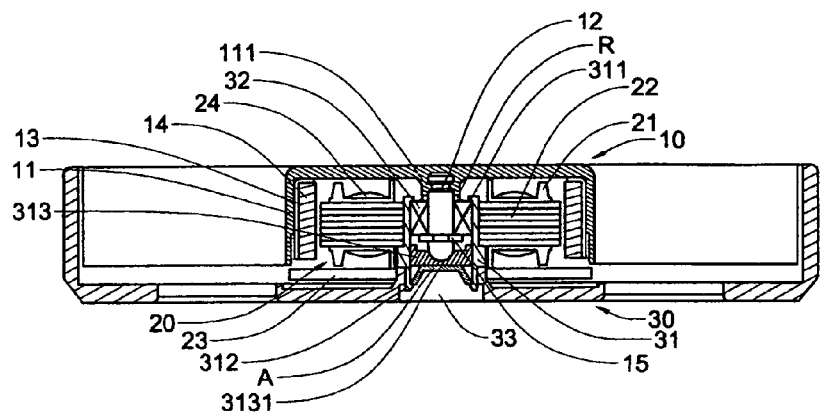
FIG. 10 is a sectional view of the tenth embodiment of single bearing of a motor according to the present invention.

Referring to FIG. 10, the tenth embodiment of a motor with single bearing according to the present invention is illustrated. The structure of the seventh embodiment is almost the same as the second embodiment and the difference of the tenth embodiment from the second embodiment is in that the spindle 12 has a circular end without connecting with the preceding fan blade hub 11 and the bottom 313 has a circular groove 3131 corresponding to the circular end of the spindle 12 so as to connect with the spindle 12. Thus, the spindle 12 can rotate in accordance with the circular groove 3131 and the spindle 12 can provide a function of locating and constitute a steady state of rotation by way of support of the bottom 313 of the axial seat 31. The bottom 313 provides a function the same as the ninth embodiment and no further detail will be described here.

Figure 11:
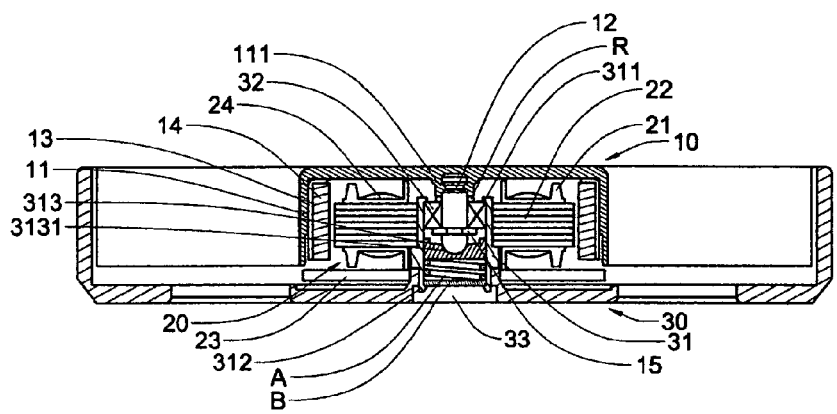
FIG. 11 is a sectional view of the eleventh embodiment of single bearing of a motor according to the present invention.

Referring to FIG. 11, the eleventh embodiment of a motor with single bearing according to the present invention is illustrated. The structure of the eleventh embodiment is almost the same as the ninth embodiment and the difference of the tenth embodiment from the ninth embodiment is in that the center of the fan base 3 has a central hole 33 and a baffle piece B can be inserted between the elastic element A and the engaging piece 312 to hide the central hole 33. The baffle piece B provides the same function as the fifth embodiment and no further detail will be described here.

Figure 12:
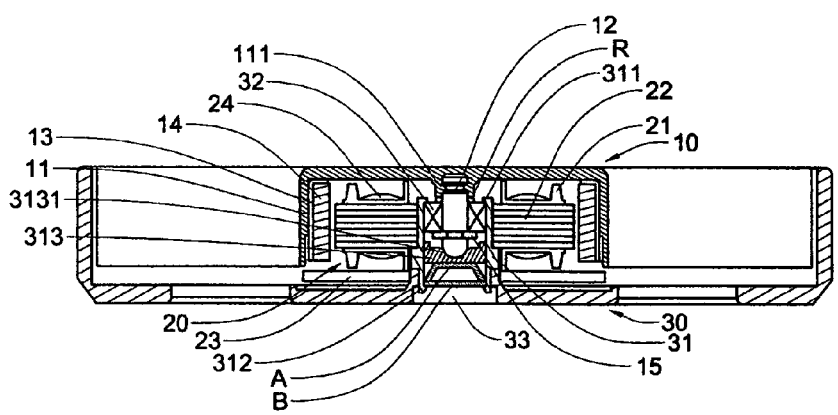
FIG. 12 is a sectional view of the twelfth embodiment of single bearing of a motor according to the present invention.

Referring to FIG. 12, the twelfth embodiment of a motor with single bearing according to the present invention is illustrated. The structure of the twelfth embodiment is almost the same as the tenth embodiment and the difference of the tenth embodiment from the ninth embodiment is in that the center of the fan base 3 has a central hole 33 and a baffle piece B can be inserted between the elastic element A and the engaging piece 312 to hide the central hole 33. The baffle piece B provides the same function as the fifth embodiment and no further detail will be described here.

Figure 13:
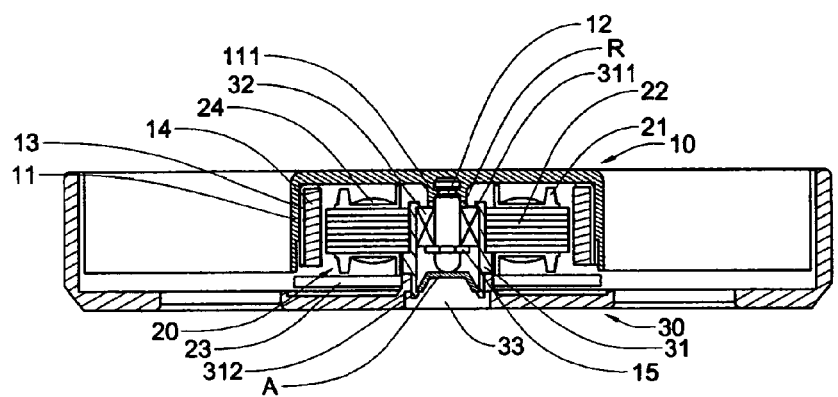
FIG. 13 is a sectional view of the thirteenth embodiment of single bearing of a motor according to the present invention.

Referring to FIG. 13, the thirteenth embodiment of a motor with single bearing according to the present invention is illustrated. The structure of the thirteenth embodiment is almost the same as the first embodiment and the difference of the thirteenth embodiment from the tenth embodiment is in that the elastic element A is provided between the engaging piece 312 and an end of the spindle 12 without connecting with the fan blade hub 11. It is noted that the axial seat is without the preceding bottom 313.

Figure 14:
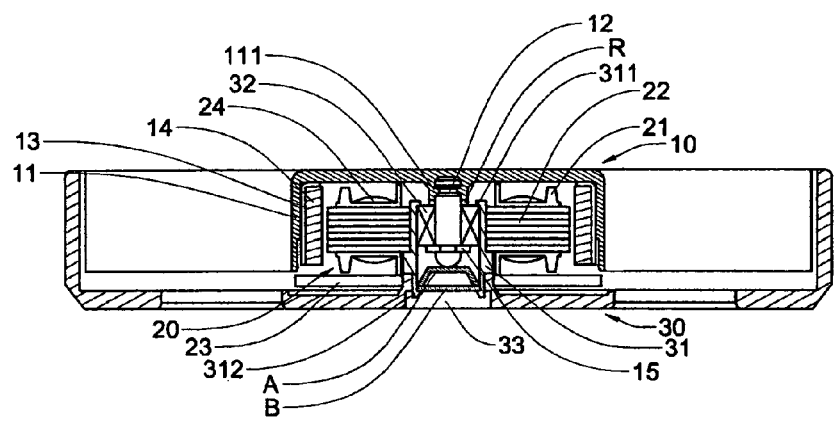
FIG. 14 is a sectional view of the fourteenth embodiment of single bearing of a motor according to the present invention.

Referring to FIG. 14, the fourteenth embodiment of a motor with single bearing according to the present invention is illustrated. The structure of the fourteenth embodiment is almost the same as the thirteenth embodiment and the difference of the tenth embodiment from the ninth embodiment is in that the center of the fan base 3 has a central hole 33 and a baffle piece B can be inserted between the elastic element A and the engaging piece 312 to hide the central hole 33. The baffle piece B provides the same function as the fifth embodiment.

Figure 15:
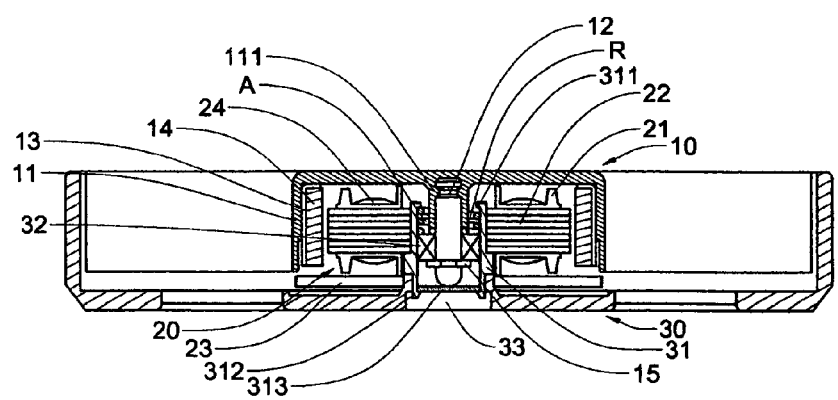
FIG. 15 is a sectional view of the fifteenth embodiment of single bearing of a motor according to the present invention.
Figure 16:
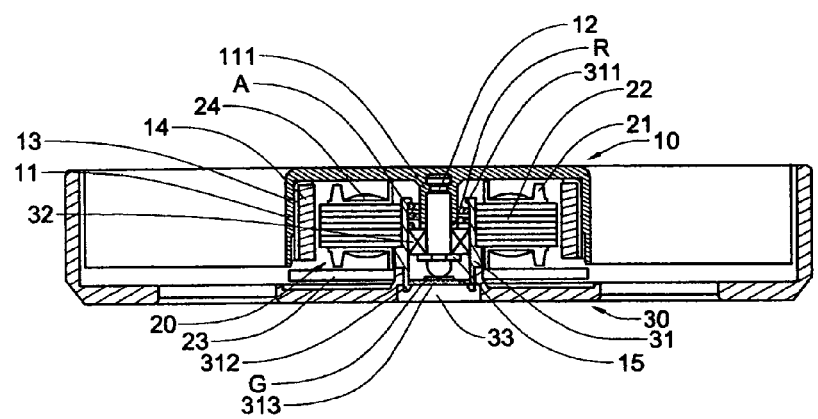
FIG. 16 is a sectional view of the sixteenth embodiment of single bearing of a motor according to the present invention.

Referring to FIG. 15, the fifteenth embodiment of a motor with single bearing according to the present invention is illustrated. The structure of the fifteenth embodiment is almost the same as the first embodiment and the difference of the fifteenth embodiment from the first embodiment is in that the elastic element A is provided between the bearing 32 and the jut part 311. Besides, referring to FIG. 16, the sixteenth embodiment of a motor with single bearing according to the present invention is illustrated. The structure of the sixteenth embodiment is almost the same as the fifteenth embodiment and the difference of the tenth embodiment from the ninth embodiment is in that a wear elastic stripe G can be added between the bottom 313 and the end without connecting with the fan blade hub 11 on the spindle 12, i.e., the wear elastic sheet G can be attached to a lateral side of the bottom 313 of the axial seat 31 so that the spindle 12 do not touch the bottom 313 to lessen wear of the spindle 12 or the axial seat 31.

Figure 17:
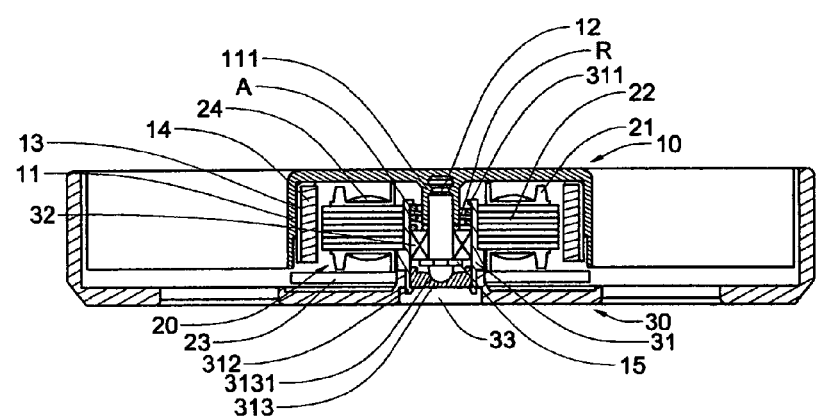
FIG. 17 is a sectional view of the seventeenth embodiment of single bearing of a motor according to the present invention.

Referring to FIG. 17, the seventeenth embodiment of a motor with single bearing according to the present invention is illustrated. The structure of the seventeenth embodiment is almost the same as the fifteenth embodiment and the difference of the seventh embodiment from the fifteenth embodiment is in that the spindle 12 has a circular end without connecting with the preceding fan blade hub 11 and the bottom 313 has a circular groove 3131 corresponding to the circular end of the spindle 12 so as to connect with the spindle 12. Thus, the spindle 12 can rotate in accordance with the circular groove 3131. The bottom 313 provides the same function as ninth embodiment so that no further detail will be described.

Figure 18:
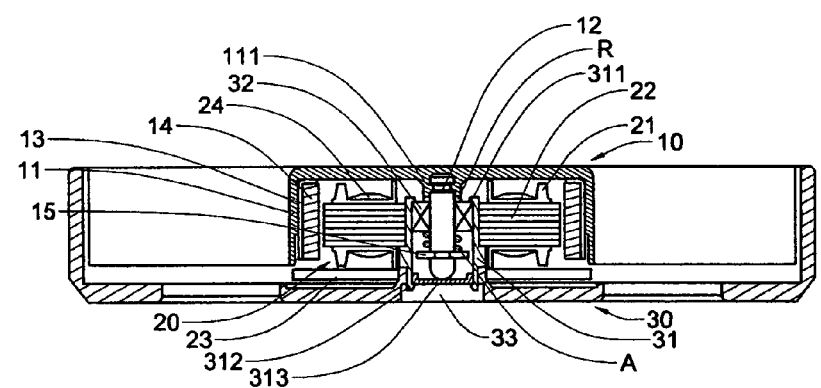
FIG. 18 is a sectional view of the eighteenth embodiment of single bearing of a motor according to the present invention.

Referring to FIG. 18, the eighteenth embodiment of a motor with single bearing according to the present invention is illustrated. The structure of the eighteenth embodiment is almost the same as the first embodiment and the difference of the eighteenth embodiment from the first embodiment is in that the elastic element A is disposed between the bearing 32 and the retaining ring 15.

Figure 19:
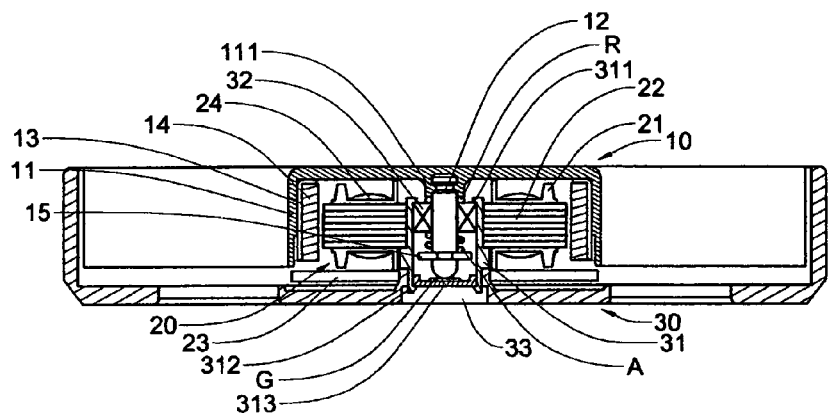
FIG. 19 is a sectional view of the nineteenth embodiment of single bearing of a motor according to the present invention.

Referring to FIG. 19, the nineteenth embodiment of a motor with single bearing according to the present invention is illustrated. The structure of the nineteenth embodiment is almost the same as the eighteenth embodiment and the difference of the nineteenth embodiment from the eighteenth embodiment is in that a wear elastic stripe G can be added between the bottom 313 and the end without connecting with the fan blade hub 11 on the spindle 12, i.e., the wear elastic sheet G can be attached to a lateral side of the bottom 313 of the axial seat 31 so that the spindle 12 do not touch the bottom 313 to lessen wear of the spindle 12 or the axial seat 31.

Figure 20:
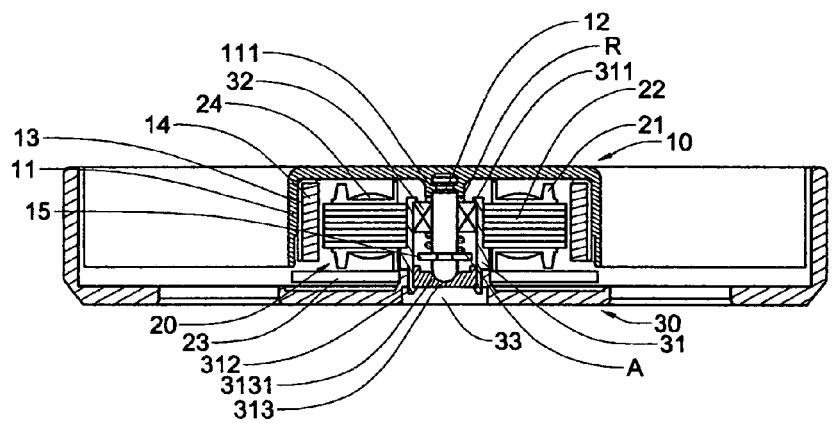
FIG. 20 is a sectional view of the twentieth embodiment of single bearing of a motor according to the present invention.

Referring to FIG. 20, the twentieth embodiment of a motor with single bearing according to the present invention is illustrated. The structure of the twentieth embodiment is almost the same as the eighteenth embodiment and the difference of the seventh embodiment from the fifteenth embodiment is in that the spindle 12 has a circular end without connecting with the preceding fan blade hub 11 and the bottom 313 has a circular groove 3131 corresponding to the circular end of the spindle 12 so as to connect with the spindle 12. Thus, the spindle 12 can rotate in accordance with the circular groove 3131. The bottom 313 provides the same function as ninth embodiment so that no further detail will be described.

Figure 21:
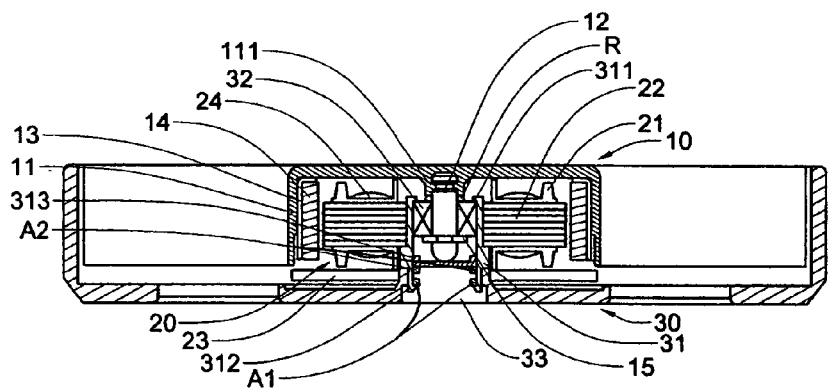
FIG. 21 is a sectional view of the twenty-first embodiment of single bearing of a motor according to the present invention.

Referring to FIG. 21, the twenty-first embodiment of a motor with single bearing according to the present invention is illustrated. The structure of the twenty-first embodiment is almost the same as the first embodiment and the difference of the twenty-first embodiment from the first embodiment is in that the elastic element A is replaced with magnetic elements A1, A2 to be provided between the bottom 313 and the engaging piece 31. The magnetic elements A1, A2 provide identical magnetic-poles so as to reject to each other and produce a preset pressure to the bearing including the bearing case and the balls therein. The effect of the magnetic elements A1, A2 is the same as the elastic element and no further detail will be described.

Figure 22:
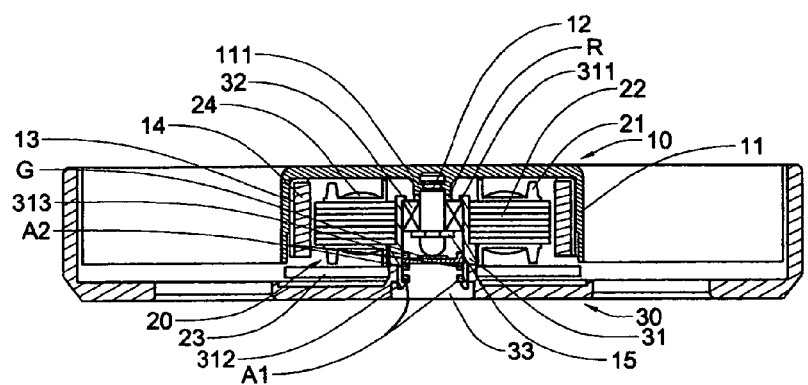
FIG. 22 is a sectional view of the twenty-second embodiment of single bearing of a motor according to the present invention.

Referring to FIG. 22, the twenty-second embodiment of a motor with single bearing according to the present invention is illustrated. The structure of the twenty-second embodiment is almost the same as the twenty-first embodiment and the difference of the twenty-second embodiment from the twenty-first embodiment is in that a wear elastic stripe G can be added between the bottom 313 and the end without connecting with the fan blade hub 11 on the spindle 12, i.e., the wear elastic sheet G can be attached to a lateral side of the bottom 313 of the axial seat 31 so that the spindle 12 do not touch the bottom 313 to lessen wear of the spindle 12 or the axial seat 31. The function of the wear elastic stripe G is the same as the third embodiment.

Figure 23:
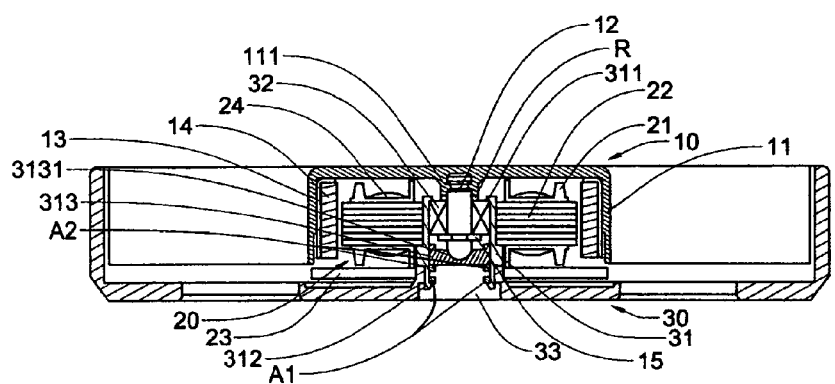
FIG. 23 is a sectional view of the twenty-third embodiment of single bearing of a motor according to the present invention.

Referring to FIG. 23, the twenty-third embodiment of a motor with single bearing according to the present invention is illustrated. The structure of the twenty-second embodiment is almost the same as the twenty-first embodiment and the difference of the twenty-second embodiment from the twenty-first embodiment is in that the bottom 313 has a circular groove 3131 to connect with the spindle 12. Thus, the spindle 12 can rotate in accordance with the circular groove 3131. The bottom 313 provides the same function as ninth embodiment so that no further detail will be described.

Figure 24:
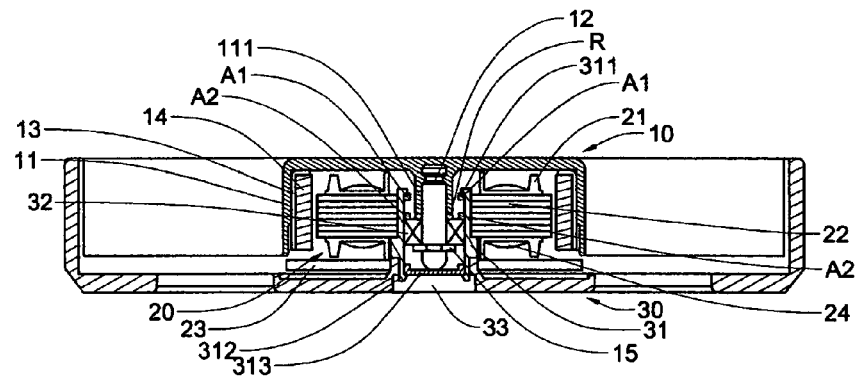
FIG. 24 is a sectional view of the twenty-fourth embodiment of single bearing of a motor according to the present invention.
Figure 25:
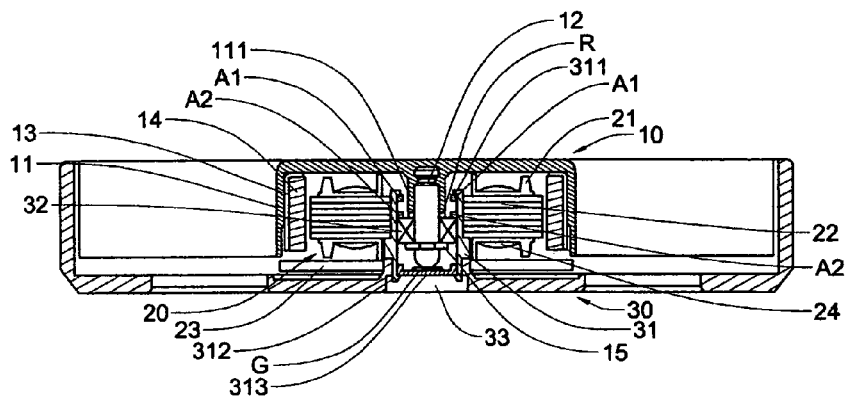
FIG. 25 is a sectional view of the twenty-fifth embodiment of single bearing of a motor according to the present invention.

Referring to FIG. 24, the twenty-fourth embodiment of a motor with single bearing according to the present invention is illustrated. The structure of the twenty-fourth embodiment is almost the same as the twenty-first embodiment and the difference of the twenty-second embodiment from the twenty-first embodiment is in that the magnetic elements A1, A2 are provided between the jut part 311 and the bearing 32 respectively. Besides, referring to FIG. 25, the twenty-fifth embodiment of a motor with single bearing according to the present invention is illustrated. The structure of the twenty-fifth embodiment is almost the same as the twenty-fourth embodiment and the difference of the twenty-sixth embodiment from the twenty-fourth embodiment is in that a wear elastic stripe G can be added between the bottom 313 and the end without connecting with the fan blade hub 11 on the spindle 12, i.e., the wear elastic sheet G can be attached to a lateral side of the bottom 313 of the axial seat 31 so that the spindle 12 do not touch the bottom 313 to lessen wear of the spindle 12 or the axial seat 31. The function of the wear elastic stripe G is the same as the third embodiment.

Figure 26:
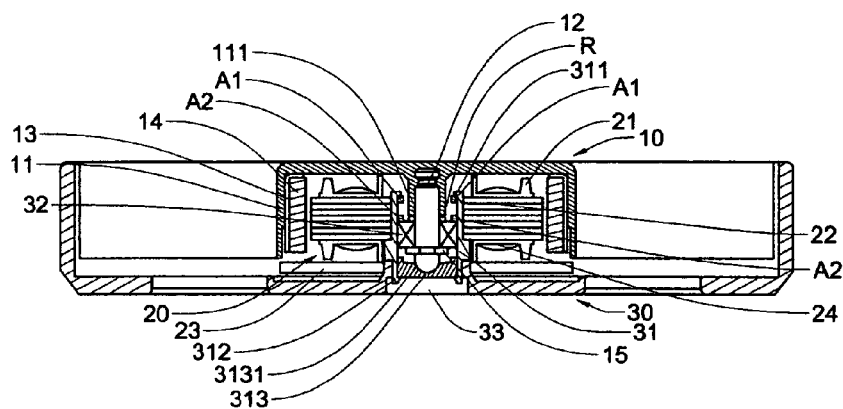
FIG. 26 is a sectional view of the twenty-sixth embodiment of single bearing of a motor according to the present invention.

Referring to FIG. 26, the twenty-sixth embodiment of a motor with single bearing according to the present invention is illustrated. The structure of the twenty-sixth embodiment is almost the same as the twenty-fourth embodiment and the difference of the twenty-sixth embodiment from the twenty-fourth embodiment is in that the bottom 313 has a circular groove 3131 corresponding to the circular end of the spindle 12 so as to connect with the spindle 12. Thus, the spindle 12 can rotate in accordance with the circular groove 3131. The bottom 313 provides the same function as ninth embodiment so that no further detail will be described.

Figure 27:
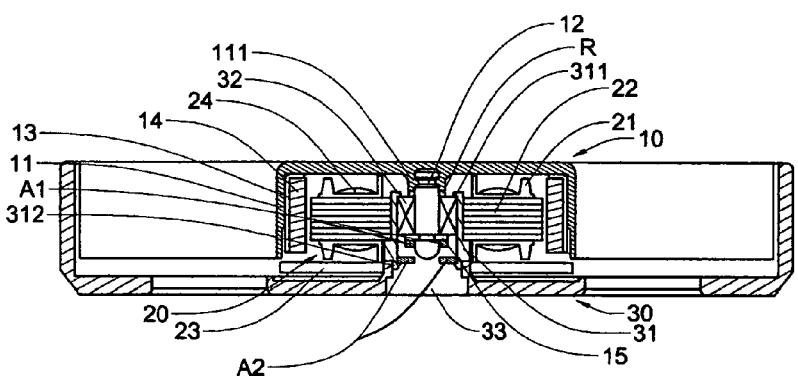
FIG. 27 is a sectional view of the twenty-seventh embodiment of single bearing of a motor according to the present invention.

Referring to FIG. 27, the twenty-seventh embodiment of a motor with single bearing according to the present invention is illustrated. The structure of the twenty-seventh embodiment is almost the same as the twenty-first embodiment and the difference of the twenty-seventh embodiment from the twenty-first embodiment is in that the bearing 32 can be located by way of the jut part 311 limiting the bearing 32 and the bearing 32 interferes with the retaining ring 15 to prevent the spindle 12 from escaping from the axial seat 31. The axial seat 31 in the present embodiment is provided without the bottom 313. Besides, the magnetic elements A1, A2 are provided between the engaging piece 312 and an edge of an end on the spindle 12 without connecting with the a fan blade hub 11 respectively. It is noted that the edge can facially contact with the retaining ring 15.

Figure 28:
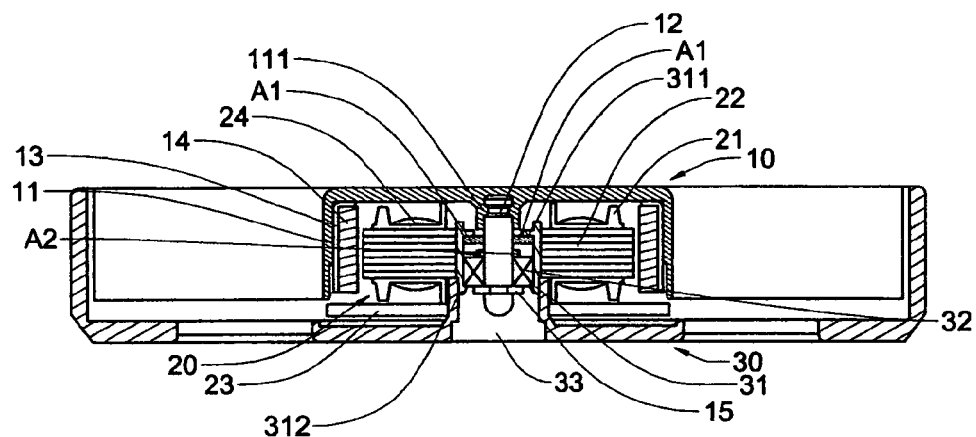
FIG. 28 is a sectional view of the twenty-eighth embodiment of single bearing of a motor according to the present invention.

Referring to FIG. 28, the twenty-eighth embodiment of a motor with single bearing according to the present invention is illustrated. The structure of the twenty-eighth embodiment is almost the same as the twenty-seventh embodiment and the difference of the twenty-eighth embodiment from the twenty-seventh embodiment is in that the magnetic elements A1, A2 are provided between the jut part 311 and the bearing 32 respectively.

Figure 29:
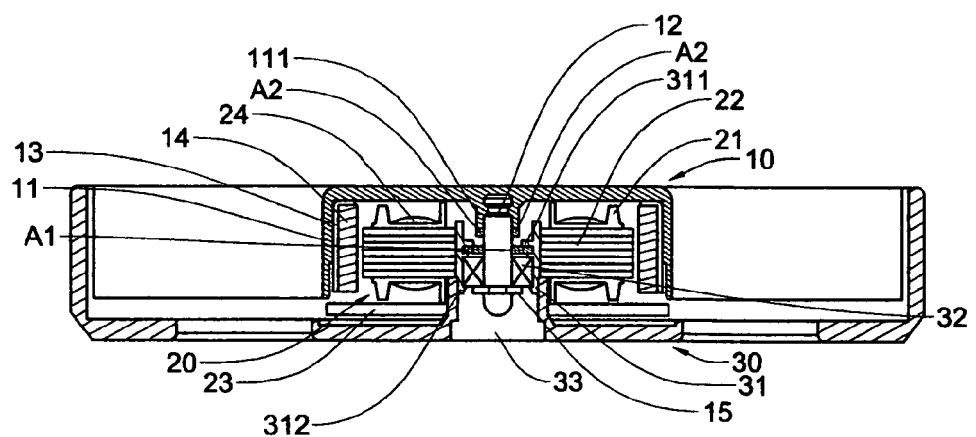
FIG. 29 is a sectional view of the twenty-ninth embodiment of single bearing of a motor according to the present invention.

Referring to FIG. 29, the twenty-ninth embodiment of a motor with single bearing according to the present invention is illustrated. The structure of the twenty-ninth embodiment is almost the same as the twenty-seventh embodiment and the difference of the twenty-ninth embodiment from the twenty-eighth embodiment is in that the magnetic element A2 is provided at the inner side of the axial seat 111.

While the invention has been described with referencing to preferred embodiments thereof, it is to be understood that modifications or variations may be easily made without departing from the spirit of this invention, which is defined by the appended claims.

What is claimed is:

1. A motor with single bearing comprising:
   a spindle;
   a fan base providing a hollow axial seat with a receiving space for receiving the spindle, and the axial seat further providing a jut part; and
   a bearing providing a casing with a plurality of balls being in the casing, and fitting with the spindle to bear the spindle during the spindle rotating;
   characterized in that an elastic element is provided in the axial seat between the bearing and the jut part to produce an elastic force as a preset pressure to the casing and the balls of the bearing;
   whereby, it prevents the bearing from creating internal clearances to keep the balls in the bearing in a steady state of running such that operation of the motor is enhanced effectively.

2. The motor with single bearing as defined in claim 1, wherein the elastic element is an elastic strip or an elastic washer.

3. The motor with single bearing as defined in claim 1, wherein the bottom of the axial seat has a wear elastic stripe at a lateral side thereof.

4. The motor with single bearing as defined in claim 1, wherein the spindle has a circular shape at an end thereof, and the axial seat has a circular groove corresponding to and connecting with the spindle.

5. The motor with single bearing as defined in claim 1, wherein an end of the spindle is joined with a fan blade set.

6. The motor with single bearing as defined in claim 4, wherein an end of the spindle is joined with a fan blade set.

7. The motor with single bearing as defined in claim 1, wherein the axial seat has an engaging piece at the inner side thereof, and the elastic element is disposed between the axial seat and the engaging piece.

8. The motor with single bearing as defined in claim 7, wherein an end of the spindle is a circular shaped end.

9. The motor with single bearing as defined in claim 1, wherein the fan blade base has a central hole.

10. The motor with single bearing as defined in claim 1, wherein the spindle is attached with a retaining ring at an end thereof.

11. The motor with single bearing as defined in claim 7, wherein the spindle is attached with a retaining ring at an end thereof, and the elastic element is disposed between the bearing and the retaining ring.

12. The motor with single bearing as defined in claim 11, wherein the bottom of the axial seat is provided with a wear elastic stripe.

13. The motor with single bearing as defined in claim 11, wherein the spindle is provided with a circular shape at an end thereof.

14. The motor with single bearing as defined in claim 13, wherein an end of the spindle is joined with a fan blade set.

* * * * *